(12) United States Patent
Son et al.

(10) Patent No.: US 8,711,237 B2
(45) Date of Patent: Apr. 29, 2014

(54) CIRCUIT DEVICE FOR PREVENTING RADIATION EMISSION IN PORTABLE TERMINAL WITH TWO CAMERAS

(75) Inventors: Je-Hyun Son, Suwon-si (KR);
Sang-Ryul Park, Hwaseong-si (KR);
Youn-Seok Kim, Suwon-si (KR);
Seung-Geol Baek, Daegu (KR);
Seong-Won Son, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 66 days.

(21) Appl. No.: 12/984,896

(22) Filed: Jan. 5, 2011

(65) Prior Publication Data

US 2011/0181761 A1 Jul. 28, 2011

(30) Foreign Application Priority Data

Jan. 22, 2010 (KR) .................. 10-2010-0005844

(51) Int. Cl.
*H04N 5/232* (2006.01)
*H04N 5/225* (2006.01)
*G09G 5/36* (2006.01)

(52) U.S. Cl.
USPC ................ 348/211.11; 348/262; 345/545

(58) Field of Classification Search
USPC ............ 348/222.1, 262, 47, 211.11; 345/502, 345/547, 545
See application file for complete search history.

(56) References Cited

U.S. PATENT DOCUMENTS

| 2003/0117501 | A1* | 6/2003 | Shirakawa | 348/218.1 |
| 2004/0119718 | A1* | 6/2004 | Kayada | 345/502 |
| 2006/0256122 | A1* | 11/2006 | Rai et al. | 345/547 |
| 2007/0177025 | A1 | 8/2007 | Kopet et al. | |

FOREIGN PATENT DOCUMENTS

| JP | 2004-200885 A | 7/2004 |
| JP | 2004200885 A | 7/2004 |

* cited by examiner

*Primary Examiner* — Twyler Haskins
*Assistant Examiner* — Akshay Trehan
(74) *Attorney, Agent, or Firm* — Jefferson IP Law, LLP

(57) ABSTRACT

A circuit device for preventing radiation emission in a portable terminal with two cameras is provided. The device includes a first camera, a second camera, a processor, and a 3-state buffer. The processor outputs a first control signal controlling an operation of the first camera and a second control signal controlling an operation of the second camera. The 3-state buffer electrically connects between the first camera and the processor, and connects or disconnects between the first camera and the processor depending on the first control signal.

16 Claims, 3 Drawing Sheets

CIRCUIT DEVICE FOR PREVENTING RADIATION EMISSION IN PORTABLE TERMINAL WITH TWO CAMERAS

PRIORITY

This application claims the benefit under 35 U.S.C. §119(a) of a Korean patent application filed in the Korean Intellectual Property Office on Jan. 22, 2010 and assigned Serial No. 10-2010-0005844, the entire disclosure of which is hereby incorporated by reference.

BACKGROUND OF THE INVENTION

1. Field of the Invention

The present invention relates to a circuit device for preventing detrimental effects of radiation emission in a portable terminal with two cameras. More particularly, the present invention relates to a circuit device for preventing the radiation emission of a harmonic frequency of a first camera from affecting another camera.

2. Description of the Related Art

In recent years, the use of video as an integral component of various services in a portable terminal has increased. For example, portable terminals enabling video photographing and video calling are being provided. In some cases, a portable terminal has a first digital camera for High-Definition (HD) video photographing and a second digital camera for video calling, the first and second digital cameras provided separately.

FIGS. 1A and 1B illustrate a portable terminal with two cameras according to the conventional art.

Referring to FIG. 1A, a folder or slide type portable terminal has a video calling camera 100 and a video photographing camera 102 in a main board and a sub board, respectively. In this structure, when the video photographing camera 102 operates or the video calling camera 100 operates, a harmonic frequency of data or a clock signal generated during an operation of the corresponding camera radiates through a Flexible Printed Circuit Board (FPCB) and affects the other camera. This occurs because the video photographing camera 102 and the video calling camera 100 share a data line and a clock line in the portable terminal.

In more detail, as illustrated in FIG. 1B, the conventional portable terminal has a problem in that, because Pixel Clock (PCLK) lines and data lines (DATA) of a video calling camera (CIF CAM) 110 and a video photographing camera (5M CAM) 112 share a common connection to an Application Processor (AP) 114, a harmonic frequency of a data or clock operation of the one camera radiates to the other camera through the FPCB.

Therefore, a need exists for an improved circuit device for preventing radiation emission in a portable terminal with two cameras.

SUMMARY OF THE INVENTION

An aspect of the present invention is to address at least the above-mentioned problems and/or disadvantages and to provide at least the advantages described below. Accordingly, an aspect of the present invention is to provide a circuit device for preventing radiation emission in a portable terminal with two cameras.

Another aspect of the present invention is to provide a circuit device for preventing the radiation emission of a harmonic frequency during a data or clock operation between two cameras using a 3-state buffer in a portable terminal with two cameras.

The above and other aspects are achieved by providing a circuit device for preventing radiation emission in a portable terminal with two cameras.

In accordance with an aspect of the present invention, a circuit device for preventing radiation emission in a portable terminal with two cameras is provided. The device includes a first camera, a second camera, a processor, and a 3-state buffer. The processor outputs a first control signal for controlling an operation of the first camera and a second control signal for controlling an operation of the second camera. The 3-state buffer electrically connects between the first camera and the processor, and connects or disconnects between the first camera and the processor depending on the first control signal.

In accordance with another aspect of the present invention, a circuit device for preventing radiation emission in a portable terminal with two cameras is provided. The device includes a first camera, a second camera, a processor, a first 3-state buffer, and an impedance device. The processor outputs a first control signal for controlling an operation of the first camera and a second control signal for controlling an operation of the second camera. The first 3-state buffer electrically connects on a first electrical path between the first camera and the processor, and connects or disconnects between the first camera and the processor depending on the first control signal. The impedance device electrically connects on a second electrical path between the first camera and the processor.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A technology for preventing the radiation emission of a harmonic frequency by connecting a 3-state buffer to a clock line and/or a data line shared by two cameras in a portable terminal according to exemplary embodiments of the present invention is described below.

Figure 1A:
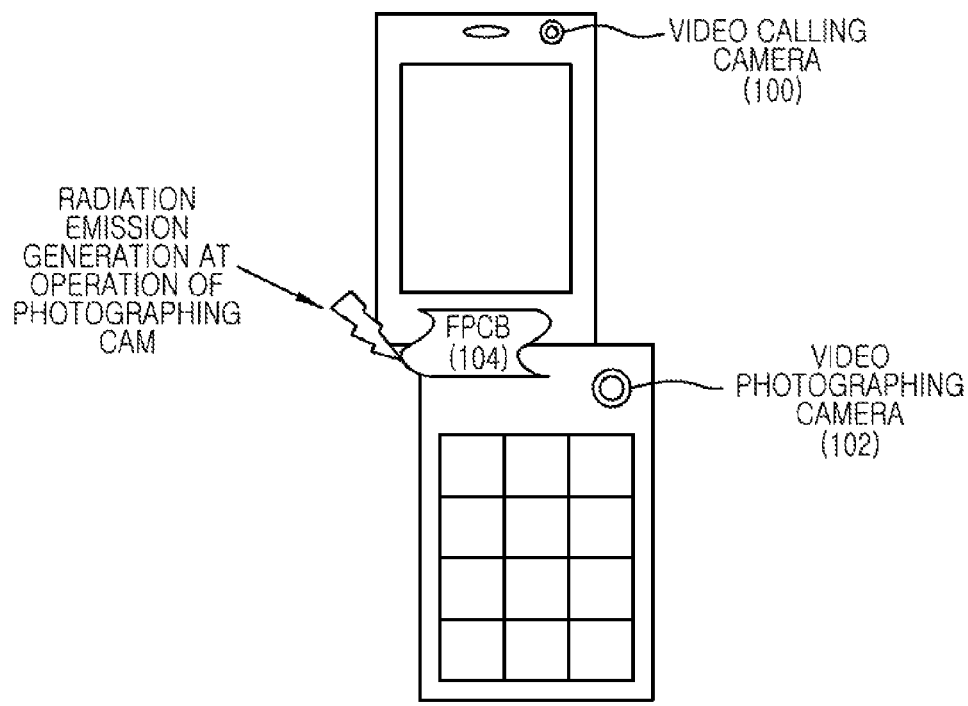
FIG. 1 is a diagram illustrating a portable terminal with two cameras according to the conventional art.
Figure 1B:
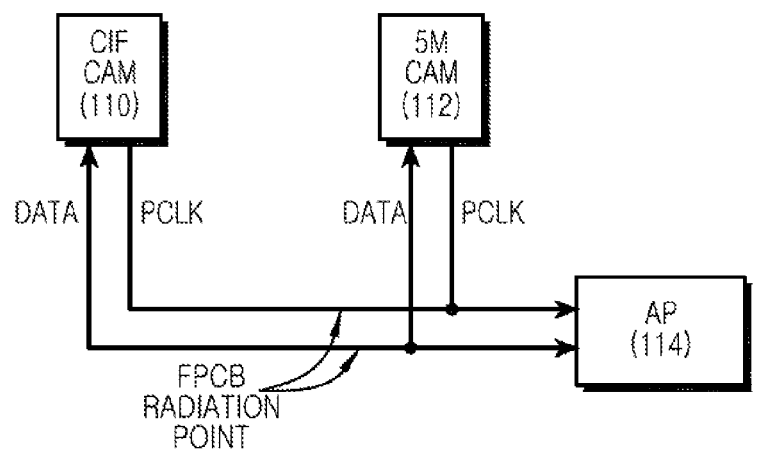
Figure 2:
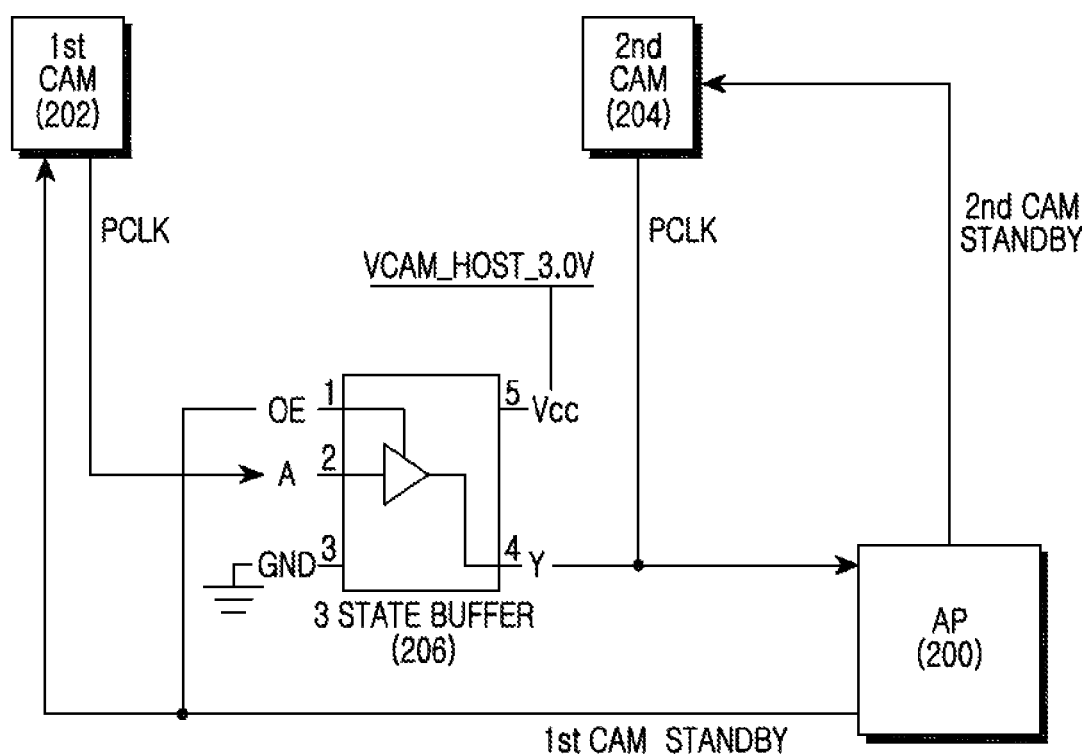
FIG. 2 is a circuit diagram illustrating a circuit device of a portable terminal with two cameras according to an exemplary embodiment of the present invention.

FIG. 2 illustrates a circuit device of a portable terminal with two cameras according to an exemplary embodiment of the present invention.

Referring to FIG. 2, the portable terminal includes an Application Processor (AP) 200, a first camera 202, a second camera 204, and a 3-state buffer 206. The following description is made exemplifying the first camera 202 as a video calling camera and the second camera 204 as a general photographing camera. However, it is to be understood that this is merely for convenience of explanation and that the invention is applicable to other cases in which the functions of the two cameras are reversed or in which there are more than two cameras or cameras having functions other than those described here.

The AP 200 performs control and processing for image photographing and video calling. For example, the AP 200 performs control and processing for sensing the generation and termination of a video photographing event or a video calling event dependent on a user's manipulation and operation of the first camera 202 or the second camera 204.

More particularly, through a terminal (e.g., a STANDBY terminal) that is connected with the first camera 202 or the second camera 204, the AP 200 outputs a signal for controlling an operation of the corresponding camera. For example, when an operation of the first camera 202 is needed, the AP 200 outputs a HIGH signal to the first camera 202 through a first CAM STANDBY terminal, and outputs a LOW signal to the second camera 204 through a second CAM STANDBY terminal. Similarly, when an operation of the second camera 204 is needed, the AP 200 outputs a LOW signal to the first camera 202 through the first CAM STANDBY terminal, and outputs a HIGH signal to the second camera 204 through the second CAM STANDBY terminal.

The AP 200 receives a pixel clock from a camera in operation and performs synchronization with the corresponding camera. For example, the AP 200 receives a pixel clock of the first camera 202 through the 3-state buffer 206 at the time of operation of the first camera 202, and receives a pixel clock from the second camera 204 at the time of operation of the second camera 204.

In an exemplary implementation, the first camera 202 is a video calling camera. The first camera 202 outputs a pixel clock to the 3-state buffer 206 if a HIGH signal is input from the AP 200 as an operation control signal, and stops outputting the pixel clock if a LOW signal is input as the operation control signal.

In a further exemplary implementation, the second camera 204 is a video photographing camera. The second camera 204 outputs a pixel clock to the AP 200 if a HIGH signal is input from the AP 200 as an operation control signal, and stops output of the pixel clock if a LOW signal is input as the operation control signal.

The 3-state buffer 206, which is a logic device having three output states, performs a role of opening/closing a circuit between an input terminal and an output terminal depending on a control signal. The closing and opening of the circuit controls to forward or cut off a signal. That is, the 3-state buffer 206 receives an operation control signal output from the AP 200 to the first camera 202 as a control signal of the 3-state buffer 206, and outputs a signal input from the first camera 202 as it is or outputs a high impedance signal depending on the control signal.

In more detail, the 3-state buffer 206 determines its output depending on an operation control signal output from the AP 200 as shown in Table 1 below.

TABLE 1

|  | First CAM STANDBY | Second CAM STANDBY | OUTPUT |
| --- | --- | --- | --- |
| First camera operation | H | L | PCLK |
| Second camera operation | L | H | HI-Z |

In Table 1, if the control signal applied to the first CAM STANDBY terminal is a HIGH signal, the 3-state buffer 206 outputs a pixel clock (PCLK) received from the first camera 202 as it is and forwards the pixel clock to the AP 200. On the contrary, if the control signal lied to the first CAM STANDBY terminal is a LOW signal, the 3-state buffer 206 does not output the pixel clock (PCLK) received from the first camera 202 but instead outputs a HIGH impedance signal (HI-Z). By outputting the HIGH impedance signal (HI-Z), the 3-state buffer 206 can obtain an effect as if the first camera 202 is separated from the circuit device. Accordingly, when the second camera 204 operates, a harmonic frequency of a clock output from the second camera 204 to the AP 200 can be prevented from radiating to the first camera 202.

Notably, an operation of the 3-state buffer 206 is not affected by an operation control signal output from the AP 200 to the second camera 204.

In FIG. 2, a clock line is illustrated between the AP 200, the first camera 202, and the second camera 204 as an example. However, a 3-state buffer may also be used on a data line between the AP and the cameras such that the 3-state buffer, in substantially the same scheme as applied to the clock line, can prevent the radiation emission of a harmonic frequency on the data line. Here, the data line denotes a line for transmitting/receiving at least one of image data input through a sensor of a camera and control data for controlling an operation of the camera.

Figure 3:
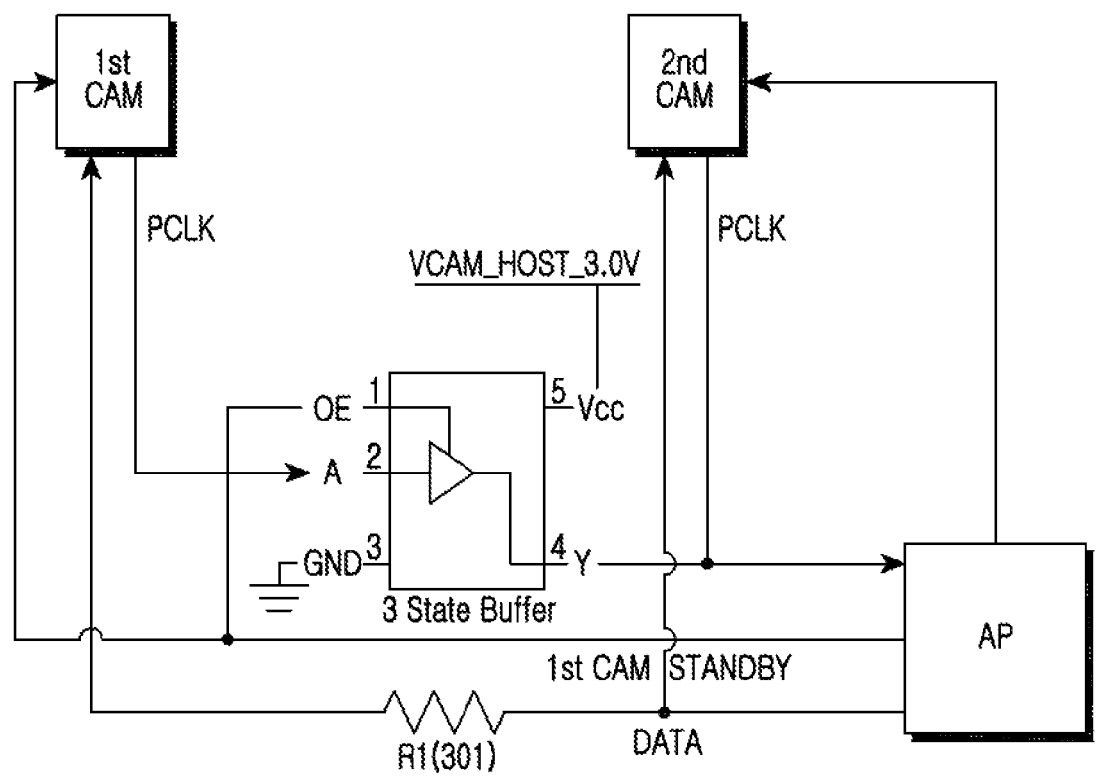
FIG. 3 is a circuit diagram illustrating a circuit device of a portable terminal with two cameras according to an exemplary embodiment of the present invention.

FIG. 3 is a circuit diagram illustrating a circuit device of a portable terminal with two cameras according to an exemplary embodiment of the present invention.

Referring to FIG. 3, the portable terminal may include an AP, a first camera, a second camera, a 3-state buffer applied to a pixel clock line and a resistor element (R1) 301 applied to a data line. That is, exemplary embodiments of the present invention may prevent the radiation emission of a harmonic frequency by applying a 3-state buffer to the pixel clock line and connecting the resistor element (R1) 301 in place of a 3-state buffer to the data line for the sake of cost saving, thus enhancing impedance. Of course, in an exemplary embodiment of the invention that is not illustrated, a 3-state buffer may be applied to a pixel clock line and another 3-state buffer may be applied to a data line.

As described above, exemplary embodiments of the present invention have an effect of, when a first camera operates, being capable of preventing a harmonic frequency of the first camera from radiating to a second camera and improving camera performance and saving an additional cost, by connecting a 3-state buffer to a clock/data line shared by the two cameras in a portable terminal with the two cameras.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A circuit device for preventing radiation emission in a portable terminal with two cameras, the device comprising:
    a first camera connected through a 3-state buffer to a shared line comprising at least one of a shared clock line and a shared data line;
    a second camera having a higher picture definition than a picture definition of the first camera and connected to the shared line with no buffer therebetween;
    a processor for outputting a first control signal controlling an operation of the first camera and of the 3-state buffer through a first terminal and for outputting a second control signal controlling an operation of the second camera through a second terminal;
    the shared line between the 3 state buffer and the processor; and
    the 3-state buffer, electrically connected between the first camera and the shared line, for receiving the first control signal and connecting or disconnecting between the first camera and the shared line depending on the received first control signal,
    wherein the first control signal and the second control signal have different values,
    wherein the 3-state buffer disconnects only the first camera from the shared line at a time of operation of the second camera having the higher picture definition, and
    wherein the second camera having the higher picture definition is continuously connected to the shared line at a time of operation of the first camera.

2. The device of claim 1, wherein, when the first control signal comprises a signal representing the operation of the first camera, the 3-state buffer connects the first camera with the shared line and outputs a signal received from the first camera to the processor and, when the first control signal comprises a signal representing the non-operation of the first camera, disconnects the first camera from the shared line.

3. The device of claim 1, wherein the at least one of the shared clock line and the shared data line of the second camera is branched from at least one of a clock line and a data line between an output terminal of the 3-state buffer and the processor.

4. The device of claim 1, wherein the first camera comprises a camera for video calling, and the second camera having the higher picture definition comprises a camera for video photographing.

5. The device of claim 1, wherein the data line comprises a line for at least one of transmitting and receiving at least one of image data input through a sensor of a camera and control data for controlling an operation of the camera.

6. The device of claim 1, wherein an operation of the 3-state buffer is not affected by the second control signal.

7. A circuit device for preventing radiation emission in a portable terminal with two cameras, the device comprising:
    a first camera connected through a first 3-state buffer to a shared line comprising at least one of a shared clock line and a shared data line;
    a second camera having a higher picture definition than a picture definition of the first camera and connected to the shared line with no buffer therebetween;
    a processor for outputting a first control signal controlling an operation of the first camera and of the first 3-state buffer through a first terminal and a second control signal controlling an operation of the second camera through a second terminal;
    the shared line between the first 3 state buffer and the processor;
    the first 3-state buffer, electrically connected on a first electrical path between the first camera and the shared line, for receiving the first control signal and connecting or disconnecting between the first camera and the shared line depending on the received first control signal; and
    an impedance device electrically connected on a second electrical path between the first camera and the processor,
    wherein the first control signal and the second control signal have different values,
    wherein the first 3-state buffer disconnects only the first camera from the shared line at a time of operation of the second camera having the higher picture definition, and
    wherein the second camera having the higher picture definition is continuously connected to the shared line at a time of operation of the first camera.

8. The device of claim 7, wherein the impedance device comprises a resistor.

9. The device of claim 7, wherein the impedance device comprises a second 3-state buffer electrically connected on a second electrical path between the first camera and the processor for connecting or disconnecting between the first camera and the processor depending on the first control signal.

10. The device of claim 9, wherein the first 3-state buffer electrically connects the at least one of the one of the shared clock line and the shared data line to the first camera and the second 3-state buffer electrically connects the first camera to the processor through another one of a clock line and a data line in which the first 3-state buffer is not connected.

11. The device of claim 10, wherein the data line comprises a line for at least one of transmitting and receiving at least one of image data input through a sensor of a camera and control data for controlling an operation of the camera.

12. The device of claim 7, wherein, when the first control signal comprises a signal representing the operation of the first camera, the first 3-state buffer connects the first camera with the shared line on the first electrical path and outputs a signal received from the first camera to the processor and, when the first control signal comprises a signal representing the non-operation of the first camera, disconnects the first camera from the shared line.

13. The device of claim 12, wherein, when the first control signal comprises a signal representing the operation of the first camera, a second 3-state buffer connects the first camera with the processor on the second electrical path and outputs a signal received from the first camera to the processor and, when the first control signal comprises a signal representing the non-operation of the first camera, disconnects the first camera from the processor.

14. The device of claim 7, wherein the at least one of the shared clock line and the shared data line of the second camera is branched from at least one of a clock line and a data line between an output terminal of the first 3-state buffer and the processor.

15. The device of claim 7, wherein the first camera comprises a camera for video calling, and the second camera having the higher picture definition comprises a camera for video photographing.

16. The device of claim 7, wherein an operation of the first 3-state buffer is not affected by the second control signal.

* * * * *